US009152245B2

(12) United States Patent
Ma et al.

(10) Patent No.: US 9,152,245 B2
(45) Date of Patent: Oct. 6, 2015

(54) ROLLING TYPE INPUT APPARATUS AND METHOD FOR SETTING SENSITIVITY THEREOF, AND ELECTRONIC EQUIPMENT

(71) Applicant: Huawei Device Co., Ltd., Shenzhen (CN)

(72) Inventors: Yong Ma, Shenzhen (CN); Ming Zhong, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 200 days.

(21) Appl. No.: 13/710,044

(22) Filed: Dec. 10, 2012

(65) Prior Publication Data
US 2013/0100024 A1   Apr. 25, 2013

Related U.S. Application Data

(63) Continuation of application No. PCT/CN2011/074552, filed on May 24, 2011.

(30) Foreign Application Priority Data

Jun. 11, 2010   (CN) .......................... 2010 1 0198129

(51) Int. Cl.
G06F 3/033   (2013.01)
G06F 3/038   (2013.01)
G06F 3/0354   (2013.01)
G06F 3/0362   (2013.01)

(52) U.S. Cl.
CPC .............. G06F 3/033 (2013.01); G06F 3/0362 (2013.01); G06F 3/0383 (2013.01); G06F 3/03549 (2013.01)

(58) Field of Classification Search
CPC ..... G06F 3/033; G06F 3/03543; G06F 3/038; G09G 5/08; G09G 5/00
See application file for complete search history.

(56) References Cited

U.S. PATENT DOCUMENTS 6,498,604 B1 *  12/2002  Jensen ......................... 345/179
2002/0135563 A1 *  9/2002  Canakapalli .................. 345/163
(Continued)

FOREIGN PATENT DOCUMENTS

CN   1247607 A   3/2000
CN   1514986 A   7/2004
(Continued)

OTHER PUBLICATIONS

Written Opinion of the International Searching Authority issued in corresponding PCT Patent Application No. PCT/CN2011/074552, mailed Sep. 1, 2011.
(Continued)

Primary Examiner — Michael Faragalla
(74) Attorney, Agent, or Firm — Brinks Gilson & Lione

(57) ABSTRACT

The embodiments of the present invention disclose a rolling type input apparatus, a method for setting sensitivity thereof and electronic equipment. The method comprises: detecting a rolling direction and the rolling distance of a rolling device (1) in the rolling process of the rolling device (1) and generating corresponding interrupts; identifying the number and the direction of the interrupts; responding to the interrupts once by transmitting a moving event signal (10) for controlling a cursor (80) to move on a screen (8) when the number of the interrupts in the same direction reaches a threshold value; detecting parameters reflecting the speed and the amplitude of operations of a user for rolling the rolling device (1); and setting the threshold value according to the detected parameters. The technical solution can improve the automation degree of the rolling type input apparatus.

22 Claims, 9 Drawing Sheets

(56) References Cited

U.S. PATENT DOCUMENTS

2007/0257887 A1* 11/2007 Chang .......................... 345/166
2009/0160774 A1   6/2009 Lee et al.
2010/0188328 A1*  7/2010 Dodge et al. ................. 345/156

FOREIGN PATENT DOCUMENTS

| CN | 101714035 A    | 5/2010 |
| CN | 101847052 A    | 9/2010 |
| DE | 102005007257 A1 | 8/2006 |
| JP | 10011212 A     | 1/1998 |

OTHER PUBLICATIONS

International Search Report issued in corresponding PCT Patent Application No. PCT/CN2011/074552, mailed Sep. 1, 2011.

Search Report issued in corresponding Chinese Patent Application No. 201010198129.X, dated Sep. 19, 2012.

Wobbrock et al., "The Angle Mouse: Target-Agnostic Dynamic Gain Adjustment Based on Angular Deviation" CHI 2009, Boston, Massachusetts, Apr. 4-9, 2009, 10 pages.

Zhai, "The Computer Mouse and Related Input Devices" Berkshire Encyclopedia of Human-Computer Interaction, Jan. 1, 2004, 6 pages.

Anonymous: "The Computer Mouse: A Timeline" Jan. 1, 2008, XP055086987, 12 pages.

Anonymous: "Widescreen Garners" Jan. 30, 2010, XP055086948, 3 pages.

Anonymous: "Any way to set Logitech wireless trackball orientation?" Apr. 28, 2010, XP055086991, 4 pages.

* cited by examiner

ROLLING TYPE INPUT APPARATUS AND METHOD FOR SETTING SENSITIVITY THEREOF, AND ELECTRONIC EQUIPMENT

CROSS-REFERENCE TO RELATED APPLICATIONS

This application is a continuation of International Application No. PCT/CN2011/074552, filed on May 24, 2011, which claims priority to Chinese Patent Application No. CN201010198129.x, filed on Jun. 11, 2010, both of which are hereby incorporated by reference in their entireties.

FIELD OF TECHNOLOGY

The present invention relates to electronic technologies, and particularly, to a method for setting sensitivity of a rolling type input apparatus, the rolling type input apparatus and electronic equipment to which the method for setting sensitivity of rolling type input apparatus is applied.

BACKGROUND OF THE INVENTION

With the unceasing development of electronic technologies, a trackball, a scroll wheel and other rolling devices have been widely applied to a wheel mouse, a steering wheel of a game machine and other rolling type input apparatuses. At present, the rolling type input apparatuses are used in various terminal products, such as mobile telephones and computers, to control the position of a cursor on a screen.

Compared to a five-way navigation, the trackball is more flexible in direction, and occupies less surface area of a casing. Compared to a two-way navigation, a scroll wheel of a wheel mouse makes it easier for users to change the direction of a cursor.

As shown in FIG. 1, a trackball 11 which is popular in a rolling device is now taken as an example to illustrate the basic operational principle of the trackball 11 set in electronic equipment provided with a rolling type input apparatus in the prior art.

A Hall component is provided in the middle (inside) and in each of the up, down, left and right directions of the trackball 11, respectively. When a user rolls the trackball 11, the Hall components will detect a rolling direction and rolling distance (or angle) of the trackball 11, and generate corresponding interrupts. Software 12 in the rolling type input apparatus may identify the number and directions of the interrupts. When the number of the interrupts in a direction reaches a threshold value set in the software 12, the software 12 will respond to the interrupts once by transmitting one moving event (or called key-press event) signal, and report the moving event signal to a processor 9 in the electronic equipment. After detecting one reported moving event signal, the processor 9 will control a cursor 80 to move on a screen 8 once. Accordingly, one moving event is finished.

The sensitivity experienced by the user is generally what distance (or angle) is rolled by the user for the trackball 11 to activate a moving event, namely, to send a moving event signal to the processor 9 which controls the cursor 80 to finish one moving event. The relationship between the rolling distance of the trackball 11 and the number of interrupts has been determined when hardware set is finished. Therefore, the sensitivity of the trackball 11 may be changed usually by setting a corresponding threshold value in the prior art.

The requirements on the sensitivity are different because of the difference of users' palms and move habits. In the prior art, the sensitivity of the rolling type input apparatus is adjusted by the way of setting a threshold value of the interrupt responded to by the software 12 in the rolling type input apparatus as shown in FIG. 1. To satisfy different requirements of users, the rolling type input apparatus with the trackball 11 in the prior art provides an easy function for setting sensitivity. The users set a value of sensitivity manually, and then the software 12 will set threshold value based on the value set by the users. The higher the value of sensitivity is set by the users, the lower the threshold value is set by the software 12, and the longer distance the cursor 80 is moved on the screen 8 when a certain distance (or angle) is rolled by the users. For example, the trackball 11 generates 6 interrupts by rolling for one revolution; if the threshold value is set to 3, then the software 12 considers that a user presses a direction-key twice (namely, 6/3) after the user rolls the trackball 11 for one revolution, and reports two moving events to the processor 9, namely, to activate two moving event signals; if the threshold value is set to 1, then the software 12 considers that the user presses the direction-key six times (namely, 6/1) after the user rolls the trackball 11 for one revolution, and reports six moving events to the processor 9.

However, it has at least the following problems.

Since sensitivity is a subjective index which can not easily be quantified, users often fail to identify the precise sensitivity suitable for their own. The most suitable sensitivity may be found by personally modifying and attempting, which requires a user's long-term use and several attempts. Since the parameters reflecting the sensitivity of the trackballs are different among different brands or types of electronic equipment, the user has to use a new brand or type of electronic equipment quite a long time and makes several attempts to identify the suitable parameters when using the new brand or type of electronic equipment. Therefore, setting the sensitivity is troublesome.

SUMMARY OF THE INVENTION

Embodiments of the present invention provide a method for setting sensitivity of a rolling type input apparatus, a rolling type input apparatus and electronic equipment to which the method for setting sensitivity of rolling type input apparatus is applied, solving the technical problem in the prior art that the traditional method for setting sensitivity of the rolling type input apparatus is troublesome.

To achieve above objective, the embodiments of the present invention adopt the following technical solutions.

The method for setting sensitivity of the rolling type input apparatus in an embodiment of the present invention comprises:

detecting a rolling direction and rolling distance of a rolling device in the rolling process of the rolling device, and generating corresponding interrupts according to the rolling direction and rolling distance of the rolling device;

identifying the number and directions of the interrupts, and responding to the interrupts once by transmitting a moving event signal for controlling a cursor to move on a screen when the number of the interrupts in the same direction reaches a threshold value;

detecting parameters reflecting a speed and amplitude of operations of a user for rolling the rolling device;

setting the threshold value according to the detected parameters.

The rolling type input apparatus in an embodiment of the present invention comprises: a rolling device, an interrupt generation device, a response module, a detection module and a setting module, wherein:

the interrupt generation device is configured to detect a rolling direction and rolling distance of the rolling device in the rolling process of the rolling device, and generate corresponding interrupts according to the rolling direction and rolling distance of the rolling device;

the response module is configured to identify the number and directions of the interrupts, and respond to the interrupts once by transmitting a moving event signal for controlling a cursor to move on a screen when the number of the interrupts in the same direction reaches a threshold value;

the detection module is configured to detect parameters reflecting a speed and amplitude of operations of a user for rolling the rolling device;

the setting module is configured to set the threshold value according to the parameters detected by the detection module.

The electronic equipment in an embodiment of the present invention comprises: a cursor control module, a rolling type input apparatus, a detection module and a setting module. The rolling type input apparatus comprises a rolling device, an interrupt generation device and a response module, wherein:

the interrupt generation device is configured to detect a rolling direction and rolling distance of the rolling device in the rolling process of the rolling device, and generate corresponding interrupts according to the rolling direction and rolling distance of the rolling device;

the response module is configured to identify the number and directions of the interrupts, and respond to the interrupts once by transmitting a moving event signal for controlling a cursor to move on a screen when the number of the interrupts in the same direction reaches a threshold value;

the cursor control module is configured to identify each moving event signal and controlling the cursor to finish the moving event corresponding to each moving event signal on the screen;

the detection module is configured to detect parameters reflecting the speed and amplitude of operations of a user for rolling the rolling device;

the setting module is configured to set the threshold value according to the parameters detected by the detection module.

Compared to the prior art, either of the above two technical solutions provided in the embodiments of the present invention can bring the following technical effects.

When the sensitivity of the rolling type input apparatus is set in the embodiment of the present invention, the parameters reflecting the speed and amplitude of operations of a user for rolling the rolling device may be detected firstly by the detection module, thus the habits and characteristics of operations of the user for using the rolling device in the rolling type input apparatus may be acquired and determined, and then the threshold value may be set according to the detected parameters. Since the threshold value is inversely proportional to the number of times that the interrupts are responded to by the response module and to the number of the moving event signals transmitted for controlling the cursor to move on the screen, and the number of the moving event signals is consistent with the number of the moving events which is directly related with the speed and number of times of the cursor's moving on the screen, the more the number of times that the interrupts are responded to, the higher the sensitivity of the rolling type input apparatus is experienced by the user. Thus, the sensitivity of the rolling type input apparatus may be set by the way of setting the threshold value.

Compared to the prior art, the embodiments of the present invention have a higher automation degree because there is no need for the user to constantly modify and try the parameters reflecting the sensitivity in person in long-term use. Even if the user is totally inexperienced in setting the sensitivity of the rolling input apparatus or uses a new brand or type of electronic equipment, the method and the rolling type input apparatus in the embodiments of the present invention are also able to determine the habits and the characteristics of operations of the user according to the speed and amplitude of the user for using the rolling type input apparatus, and then automatically set the sensitivity suitable for the user, thus solving the technical problem that the traditional method for setting sensitivity of the rolling type input apparatus is troublesome.

BRIEF DESCRIPTION OF THE DRAWING(S)

To illustrate the technical solution under the embodiments of the present invention or the prior art more clearly, a brief introduction on the accompanying drawings which are needed in the description of the embodiments or the prior art is given below. Apparently, the accompanying drawings in the description below are merely some of the embodiments of the present invention, based on which other drawings can be obtained by the persons of ordinary skill in the art without any creative effort.

DETAILED DESCRIPTION OF THE EMBODIMENTS

The technical solutions in the embodiments of the present invention will be hereinafter described clearly and completely with reference to the accompanying drawings in the embodiments of the present invention. Evidently, the described embodiments are merely part, but not all, of the embodiments of the present invention. All other embodiments, which can be derived by the persons of ordinary skill in the art based on the embodiments of the present invention without any creative effort, shall fall within the protection scope of the present invention.

The embodiments of the present invention provide a convenient method for setting sensitivity of a rolling type input apparatus having a higher automation degree, a rolling type device and electronic equipment to which the method for setting sensitivity of rolling type input apparatus is applied.

Figure 1:
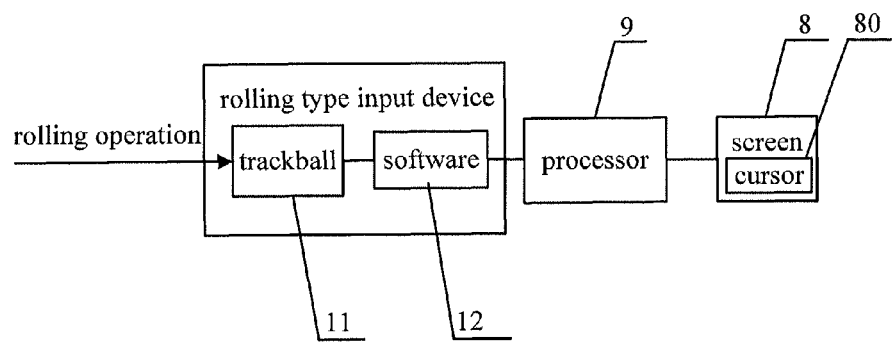
FIG. 1 is a schematic diagram showing that a user performs a rolling operation on a trackball in a rolling type input apparatus and controls a cursor on a screen through the trackball in the rolling type input apparatus in the prior art.
Figure 2:
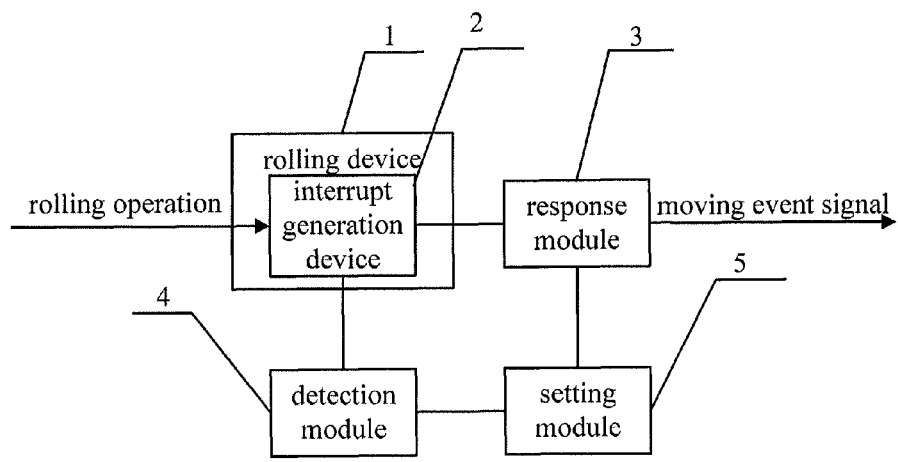
FIG. 2 is a schematic diagram showing the connection among the internal components according to an embodiment of the rolling type input apparatus of the present invention.
Figure 4:
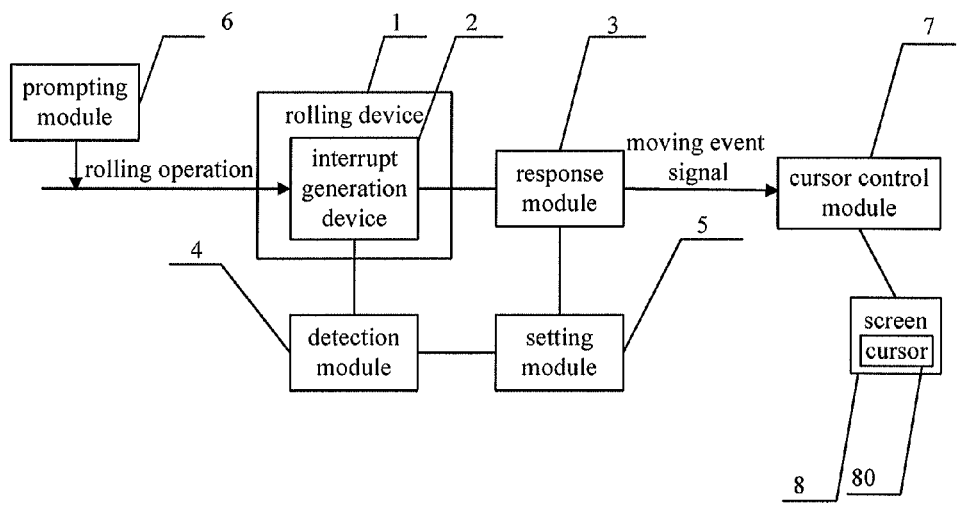
FIG. 4 is a schematic diagram showing the connection among the internal components of the electronic equipment in the embodiment of the present invention.
Figure 5:
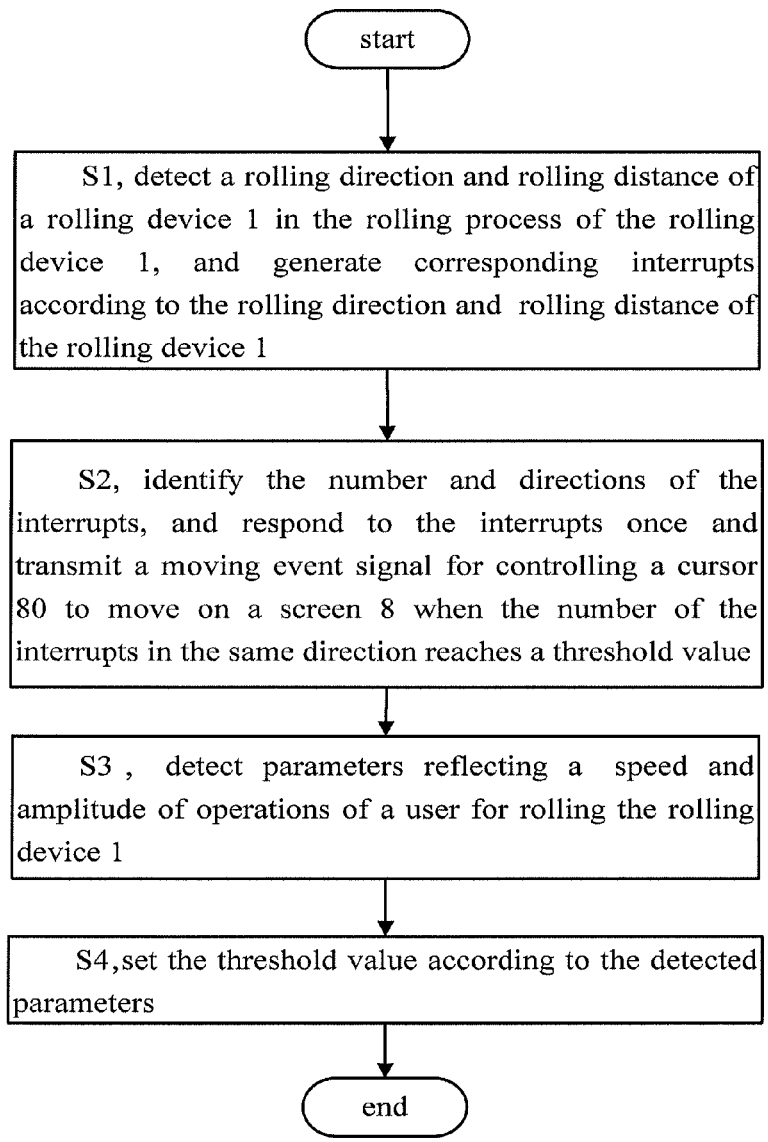
FIG. 5 is a schematic flowchart according to an embodiment of the method for setting sensitivity of the rolling type input apparatus of the present invention.

As shown in FIG. 2, FIG. 4 and FIG. 5, a method for setting sensitivity of a rolling type input apparatus in an embodiment of the present invention comprises:

S1, detect a rolling direction and rolling distance of a rolling device 1 in the rolling process of the rolling device 1, and generate corresponding interrupts according to the rolling direction and rolling distance of the rolling device 1;

S2, identify the number and directions of the interrupts, and responding to the interrupts once by transmitting a moving event signal for controlling a cursor 80 to move on a screen 8 when the number of the interrupts in the same direction reaches a threshold value;

S3, detect parameters reflecting a speed and amplitude of operations of a user for rolling the rolling device 1;

S4, set the threshold value according to the detected parameters.

When the sensitivity of the rolling type input apparatus is set in the embodiment of the present invention, the parameters reflecting the speed and the amplitude of operations of a user for rolling the rolling device 1 may be detected firstly, thus the habits and characteristics of operations of the user for using the rolling device 1 in the rolling type input apparatus may be acquired and determined, and then the threshold value may be set according to the detected parameters.

Since the threshold value is inversely proportional to the number of times that interrupts are responded to by the response module 3 in the rolling type input apparatus and to the number of the moving event signals transmitted for controlling the cursor 80 to move on the screen 8, and the number of the moving event signals is consistent with the number of the moving events while the number of the moving events is directly related with the speed and number of times of the cursor 80's moving on the screen 8, the more the number of times that interrupts are responded to, the higher the sensitivity of the rolling type input apparatus is experienced by the user. Therefore, the sensitivity of the rolling type input apparatus may be set by the way of setting the threshold value.

Compared to the prior art, the embodiments of the present invention have a higher automation degree because there is no need for the user to constantly modify and try the parameters reflecting the sensitivity in person in long-term use. Even if the user is totally inexperienced in setting the sensitivity of the rolling input apparatus or uses a new brand or type of electronic equipment, the rolling type input apparatus in the embodiments of the present invention is also able to determine the habits and characteristics of operations of the user according to the speed and amplitude of the user for using the rolling type input apparatus, and then automatically set the sensitivity suitable for the user, thus solving the technical problem that the traditional method for setting sensitivity of the rolling type input apparatus is troublesome.

In this embodiment, the parameters reflecting the speed and the amplitude of operations of the user for rolling the rolling device 1 comprise any one or combination of the following parameters:

the number of the moving events required for the cursor 80 to move across a distance of the entire screen 8 on the screen 8;

the number of the interrupts generated by an interrupt generation device 2 in the rolling type input apparatus when the rolling device 1 is rolled once;

a distance of the cursor 80 moving on the screen 8 when the rolling device 1 is rolled once;

a duration for the rolling device 1 being rolled once;

an interval between two rolling operations.

The concrete meanings of the above parameters have already been explained in the above description and will not be introduced here repeatedly.

Figure 3:
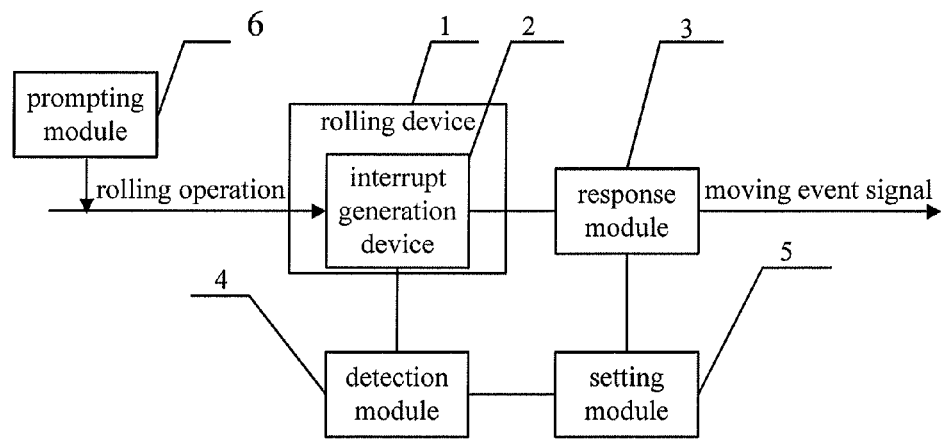
FIG. 3 is a schematic diagram showing the connection among the internal components according to another embodiment of the rolling type input apparatus of the present invention.
Figure 6:
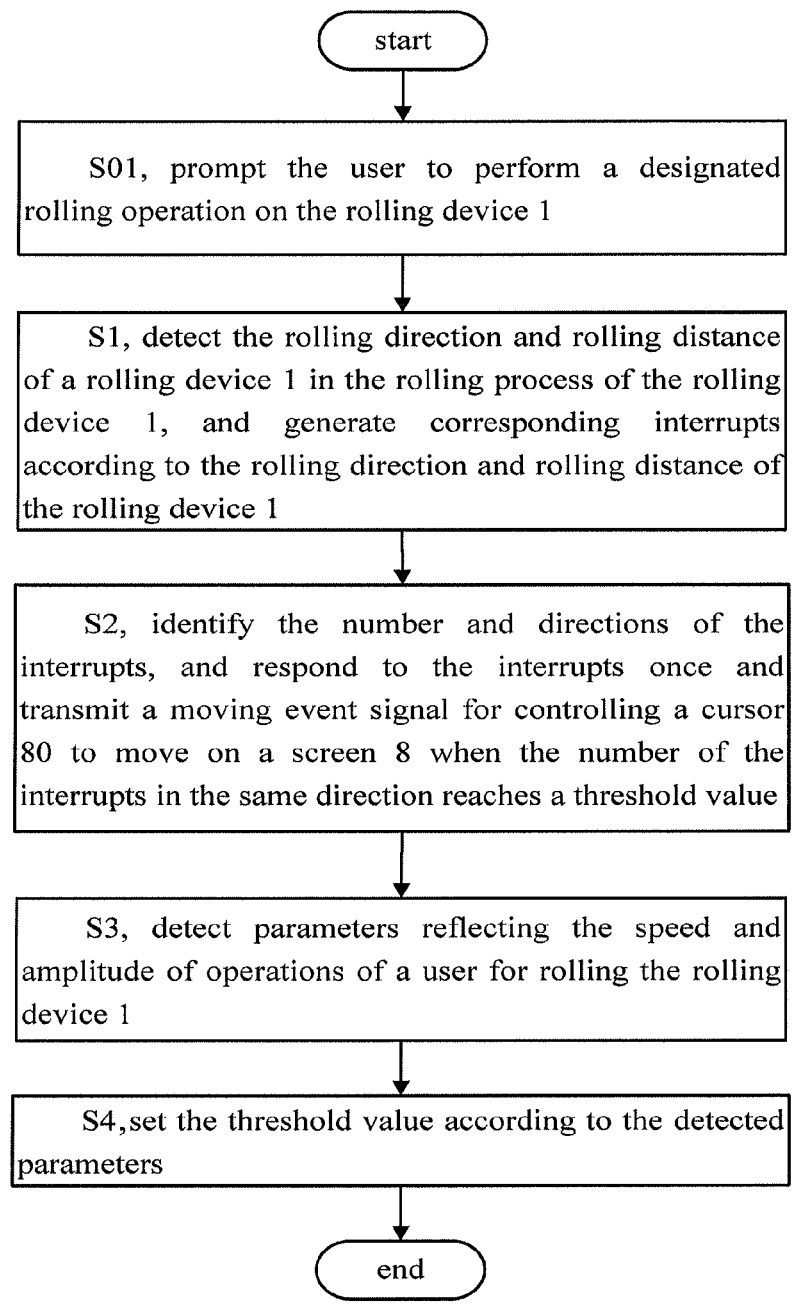
FIG. 6 is a schematic flowchart according to another embodiment of the method for setting sensitivity of the rolling type input apparatus of the present invention.

A further improvement of the embodiment of the present invention is shown in FIG. 3 and FIG. 6, wherein before rolling the rolling device 1 the method further comprises:

S01, prompt the user to perform a designated rolling operation on the rolling device 1, so as to detect parameters reflecting the speed and amplitude of operations of the user for rolling the rolling device 1 and set the threshold value according to the detected parameters.

In this embodiment, S01 may be performed by any way of playing a prompt tone, popping up a prompt dialog box, displaying a prompt text, playing an animation, etc. to direct the user pertinently to roll the rolling device 1 in the rolling type input apparatus according to requirements, which helps to detect the parameters required for setting the sensitivity of the rolling type input apparatus accurately, rapidly and effectively.

Figure 7:
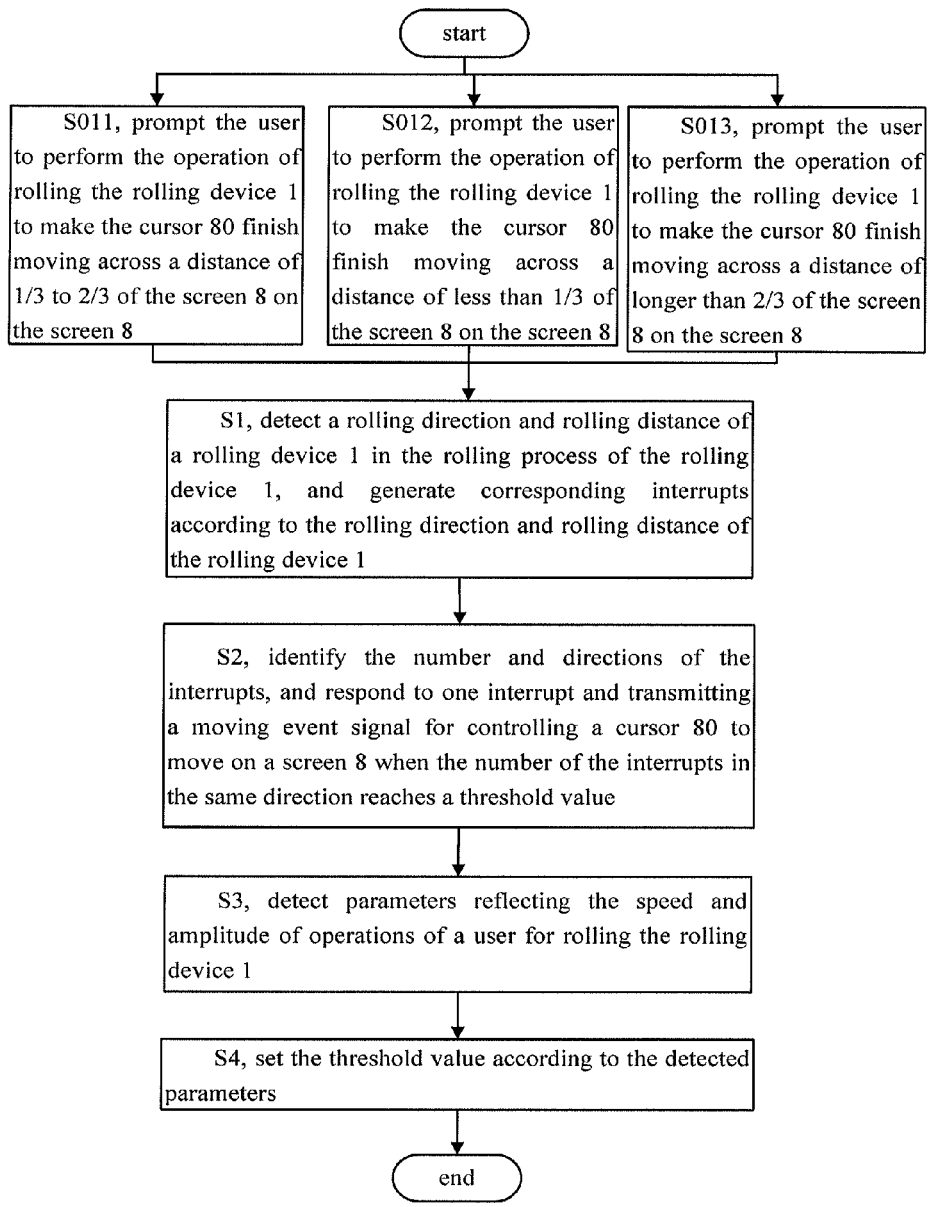
FIG. 7 is a schematic flowchart according to still another embodiment of the method for setting sensitivity of the rolling type input apparatus of the present invention.

As shown in FIG. 4 and FIG. 7, the method of prompting the user to perform the designated rolling operation on the rolling device in this embodiment comprises any one or combination of the following steps:

S011, prompt the user to roll the rolling device 1 to perform an operation of making the cursor 80 finish moving across a distance of $\frac{1}{3}$ to $\frac{2}{3}$ of the screen 8 on the screen 8;

S012, prompt the user to roll the rolling device 1 to perform an operation of making the cursor 80 finish moving across a distance of less than $\frac{1}{3}$ of the screen 8 on the screen 8;

S013, prompt the user to roll the rolling device 1 to perform an operation of making the cursor 80 finish moving across a distance of longer than $\frac{2}{3}$ of the screen 8 on the screen 8.

In this embodiment, the scenes in which the user controls the cursor 80 to finish a moving event by rolling the rolling device 1 in the rolling type input apparatus may be divided into 3 scenes:

1. a middle-distance moving scene: the middle-distance moving scene may also be called as a common operation scene, and the middle-distance is the distance of the cursor 80's moving on the screen 8 after a majority of users normally control the cursor 80 to finish one moving event though the rolling type input apparatus.

Since the distance of the cursor 80's moving on the screen 8 after a majority of users normally finish one moving event is a distance of $\frac{1}{3}$ to $\frac{2}{3}$ of the entire screen 8, the middle-distance moving scene in this embodiment may be defined as an operation of making the cursor 80 finish moving across a distance of $\frac{1}{3}$ to $\frac{2}{3}$ of the screen 8. Of course, the specific value of the distance of the cursor 80's moving on the screen 8 in the middle-distance moving scene may be defined based on the types and requirements of the users; for example, the middle-distance moving scene may also be defined as an operation of making the cursor 80 finish moving across a distance of $\frac{1}{4}$ to $\frac{4}{5}$ of the screen 8.

2. an accurate positioning scene: accurate positioning is usually an operation of positioning the cursor 80 to a certain point of the screen 8. Since it is generally unable for the cursor 80 to be positioned to a certain point on the screen 8 in one move, and it needs to be moved to the point little by little, the accurate positioning scene in this embodiment may be defined as an operation of making the cursor 80 move across a distance of less than ⅓ of the screen 8 on the screen 8. Of course, the specific value of the accurate positioning scene also may be defined based on the types and requirements of the users, for example, the accurate positioning scene may also be defined as an operation of making the cursor 80 finish moving across a distance of less than ¼ of the screen 8.

3. a long-distance moving scene: the long-distance moving scene is the scene where the distance of the cursor 80's moving on the screen 8 after the user controls the cursor to finish one moving event is longer than the middle-distance, and thus the long-distance moving scene in this embodiment may be defined as an operation of making the cursor 80 move across a distance of longer than ⅔ of the screen 8 on the screen 8. Of course, the specific value of the long-distance moving scene may be defined according to the types and requirements of the users; for example, the long-distance moving scene may also be defined as an operation of making the cursor 80 move across a distance of longer than one screen 8.

The habits and characteristics of the user's operating the rolling device 1 in the rolling type input apparatus may be basically acquired and determined by collecting the speed and amplitude of operations of the user for rolling the rolling device 1 in the rolling type input apparatus in the 3 scenes above.

The users with different jobs and characters often use different scenes when using the rolling type input apparatus. For example, some of plotting operators or photo processing operators often use the rolling type input apparatus in the accurate positioning scene, while the common users often use the rolling type input apparatus in the middle-distance moving scene. Therefore, in this embodiment, the sensitivity of the rolling type input apparatus may be adjusted only in the required scenes of the users which may be one of the above 3 scenes, or may also be 2 or 3 of the above 3 scenes. For example, for some of plotting operators, photo processing operators and other users who often use the rolling type input apparatus in the accurate positioning scene, the sensitivity of the rolling type input apparatus may be adjusted in the accurate positioning scene only, and accordingly the users may be only prompted to roll the rolling device 1 to make the cursor 80 move across a distance of less than ⅓ of the screen 8 when the habits and characteristics of the users' operating the rolling device 1 in the rolling type input device are determined.

It can be seen from above that the threshold value of the rolling type input apparatus may be set before the user normally uses the rolling type input apparatus by prompting the user to perform the designated rolling operation on the rolling device, and does not need to be set again when the user uses the rolling type input apparatus normally.

Of course, in this embodiment, the user may not be prompted to perform the designated rolling operation on the rolling device before using the rolling type input apparatus normally, and the threshold value may be set in the process of the user's using the rolling type input apparatus normally.

Figure 8:
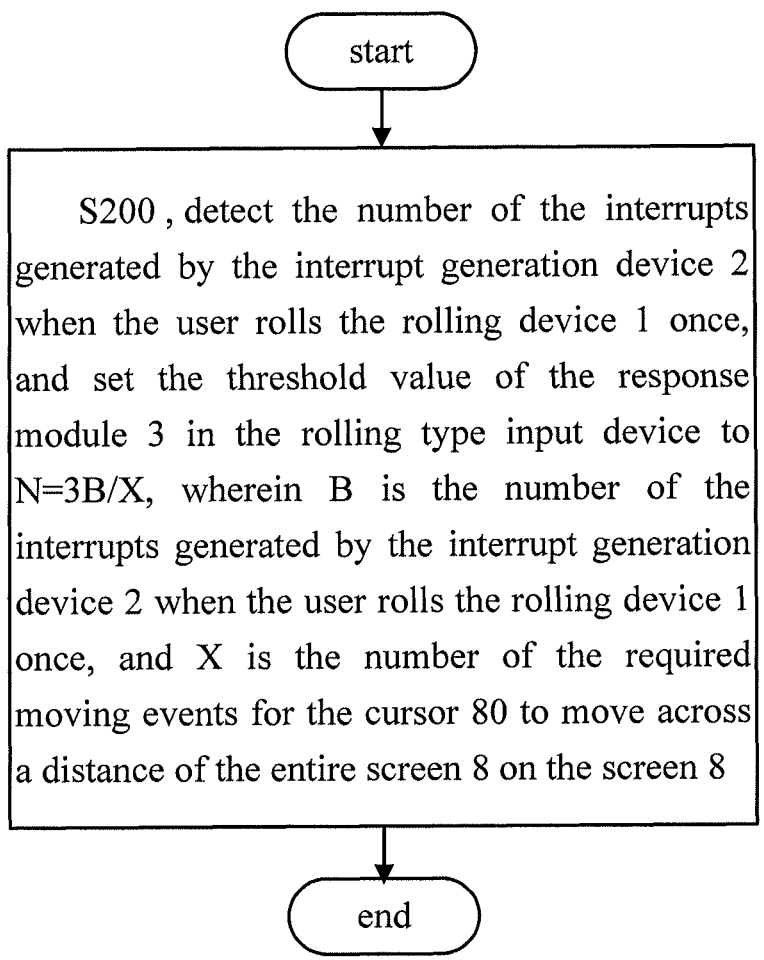
FIG. 8 is a schematic flowchart according to an embodiment of step S4 of the method for setting sensitivity of the rolling type input apparatus of the present invention.

As shown in FIGS. 4 and 8, the method of setting the threshold value according to the detected parameters in this embodiment further comprises:

S200, detect number of the interrupts generated by the interrupt generation device 2 when the user rolls the rolling device 1 once, and set the threshold value of the response module 3 in the rolling type input apparatus to N=3B/X, wherein:

B is the number of the interrupts generated by the interrupt generation device 2 when the user rolls the rolling device 1 once;

X is the number of the moving events required for the cursor 80 to move across distance of the entire screen 8 on the screen 8.

The better effect of the user's using the rolling type input apparatus is that the cursor 80 on the screen 8 may be moved to the required position by rolling the rolling device 1 1 to 2 times, namely, the cursor 80 on the screen 8 may be moved to the required position by finishing 1 to 2 moving events, and preferably that the cursor 80 on the screen 8 may be moved to the required position by rolling the rolling device 1 2 times, namely, the cursor 80 on the screen 8 may be moved to the required position by finishing 2 moving events.

According to experience, the middle-distance moving scene is widely used by the common users, while the best ratio of the distance moved by the cursor 80 to the size of the screen 8 is ⅔ for the middle-distance moving scene. Assuming that B is the number of the interrupts generated by the interrupt generation device 2 when the user rolls the rolling device 1 once and X is the number of the moving events required for the cursor 80 to move across a distance of the entire screen 8 on the screen 8, the number of the interrupts generated by the interrupt generation device 2 when the user rolls the rolling device 1 twice, namely, when two moving events are finished, is 2B, while the number of the required moving events which make the cursor 80 on the screen 8 move across a distance of ⅔ of the screen 8 is X*⅔.

Since the number of the moving events which have been finished by the cursor 80 on the screen 8 when the rolling device 1 is rolled once=the number of the interrupts generated by the interrupt generation device 2 when the rolling device 1 is rolled once÷the threshold value.

The following equation may be deduced from the above equation: the threshold value=the number of the interrupts generated by the interrupt generation device 2 when the rolling device 1 is rolled once÷the number of the moving events which have been finished by the cursor 80 on the screen 8 when the rolling device 1 is rolled once.

Therefore, the threshold value N=2B÷(X*⅔)=3B/X, and thus the best threshold value of the response module 3 is N=3B/X.

It can be seen from above that most of the users may move the cursor 80 on the screen 8 to the required position by finishing two moving events, namely, rolling the rolling device twice, when using the rolling type input apparatus by the above setting.

Figure 9:
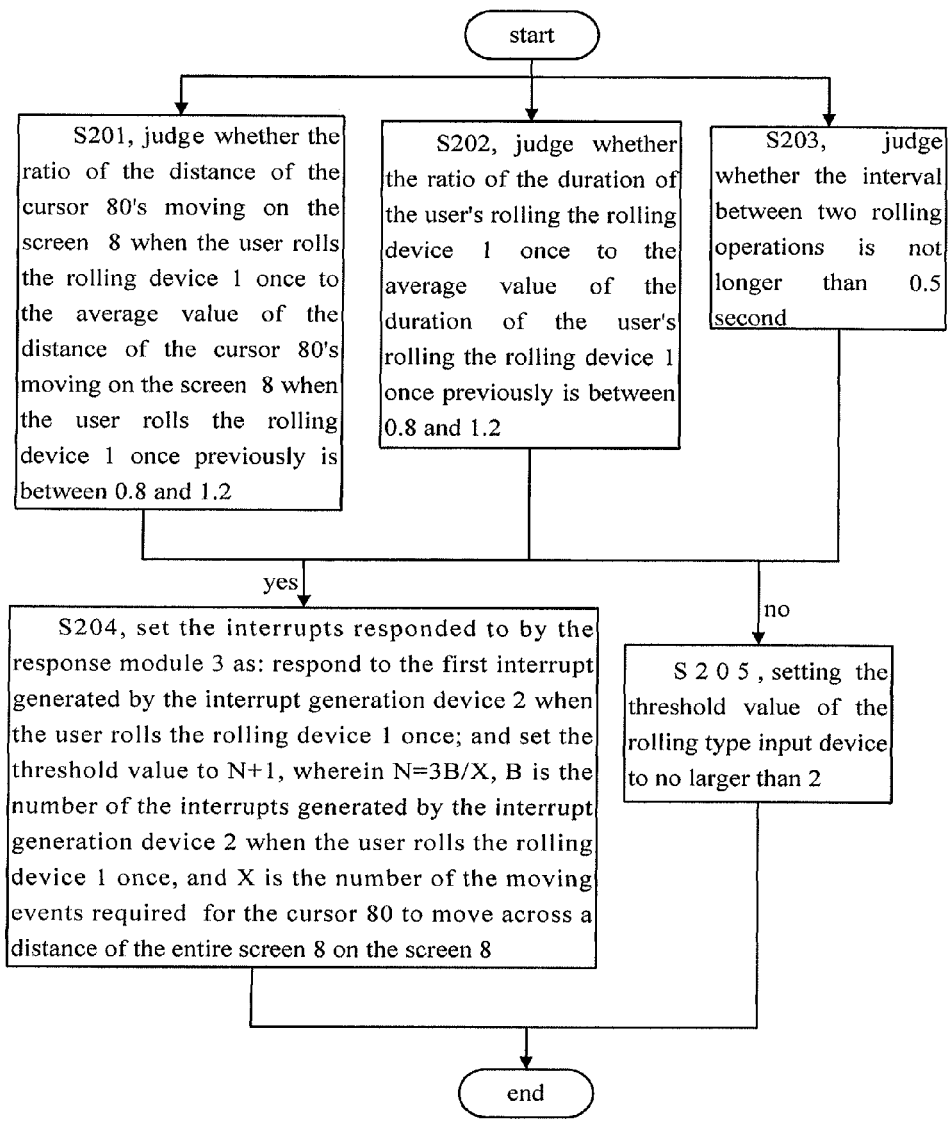
FIG. 9 is a schematic flowchart according to another embodiment of step S4 of the method for setting sensitivity of the rolling type input apparatus of the present invention.

As shown in FIG. 4 and FIG. 9, in this embodiment, in the event that the user rolls the rolling device 1 to finish at least two operations each of which makes the cursor 80 move across a distance of less than ⅓ of the screen 8 on the screen 8, the method of setting the threshold value according to the detected parameters comprises:

S201, judge whether the ratio of the distance of the cursor 80's moving on the screen 8 when the user rolls the rolling device 1 once to the average value of distance of the cursor 80's moving on the screen 8 when the user rolls the rolling device 1 once previously is between 0.8 and 1.2;

S202, judge whether the ratio of the duration of the user's rolling the rolling device 1 once to the average value of the duration of the user's rolling the rolling device 1 once previously is between 0.8 and 1.2;

S203, judge whether the interval between two rolling operations is not longer than 0.5 second;

S204, if all judgment results of S201, S202 and S203 are yes, set the interrupts responded to by the response module 3 as:

responding to the first interrupt generated by the interrupt generation device 2 when the user rolls the rolling device 1 once; and setting the threshold value to N+1, wherein N=3B/X, B is the number of the interrupts generated by the interrupt generation device 2 when the user rolls the rolling device 1 once, and X is the number of the moving events required for the cursor 80 to move across a distance of the entire screen 8 on the screen 8;

S205, if all judgment results of S201, S202 and S203 are no, set the threshold value of the rolling type input apparatus to no larger than 2.

The performance of the above S201, S202, and S203 is not limited by the sequence.

This case is mainly aimed at the accurate positioning scene. It shows that the operation of the user is skillful, if the ratio of the distance of the cursor 80's moving on the screen 8 when the user rolls the rolling device 1 once to the average value of distance of the cursor 80's moving on the screen 8 when the user rolls the rolling device once previously is between 0.8 and 1.2, and the ratio of the duration of the user's rolling the rolling device 1 once to the average value of the duration of the user's rolling the rolling device 1 once previously is between 0.8 and 1.2. It shows that the rolling action of the user is fast if the interval between two rolling operations is not longer than 0.5 second. Therefore, the response speed of the response module 3 needs to be increased at the beginning and then to be gradually reduced to avoid the problem of excessive rolling in the process of the user's rolling the rolling device 1.

Conversely, it shows that the user operates the rolling type input apparatus quite unskillfully and the speed of operation is very slow, and thus the number of times of operations of the user should be reduced to increase the response speed and set a lower threshold value.

Of course, in this embodiment, the specific value for judging whether the operation of the user is relatively skillful may be increased or decreased properly, and the threshold value may be set according to the different types of users.

Figure 10:
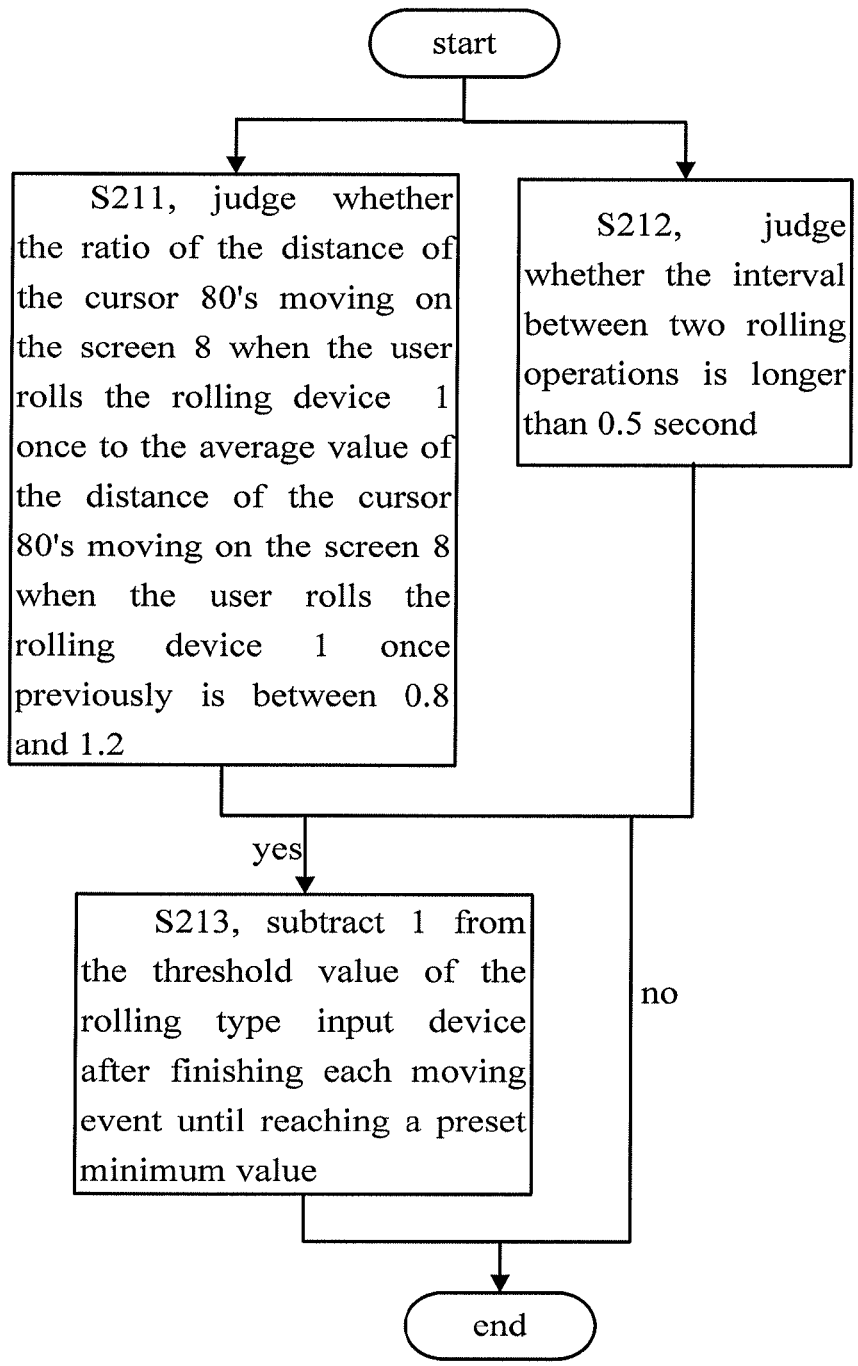
FIG. 10 is a schematic flowchart according to still another embodiment of step S4 of the method for setting sensitivity of the rolling type input apparatus of the present invention.

As shown in FIG. 4 and FIG. 10, when the user rolls the rolling device 1 and finishes at least two operations each of which makes the cursor 80 move across a distance of longer than ⅔ of the screen 8 on the screen 8, the method of setting the threshold value according to the detected parameters comprises:

S211, judge whether the ratio of the distance of the cursor 80's moving on the screen 8 when the user rolls the rolling device 1 once to the average value of the distance of the cursor 80's moving on the screen 8 when the user rolls the rolling device 1 once previously is between 0.8 and 1.2;

S212, judge whether the interval between two rolling operations is longer than 0.5 second;

S213, if both of the judgment results of S211 and S212 are yes, subtract 1 from the threshold value of the rolling type input apparatus after finishing each moving event until reaching a preset minimum value.

The performance of the above S211 and S212 is not limited by the sequence.

This case is mainly aimed at the long-distance moving scene. It shows that the operation of the user is skillful but the action is slow if the interval between two rolling operations is longer than 0.5 second. To avoid fatigue caused by a long time using of the user, subtract 1 from the threshold value of the rolling type input apparatus when each moving event is finished until a preset minimum value is reached. Accordingly, the response speed of the response module 3 is higher and higher, thus bringing the effect of acceleration.

Figure 11:
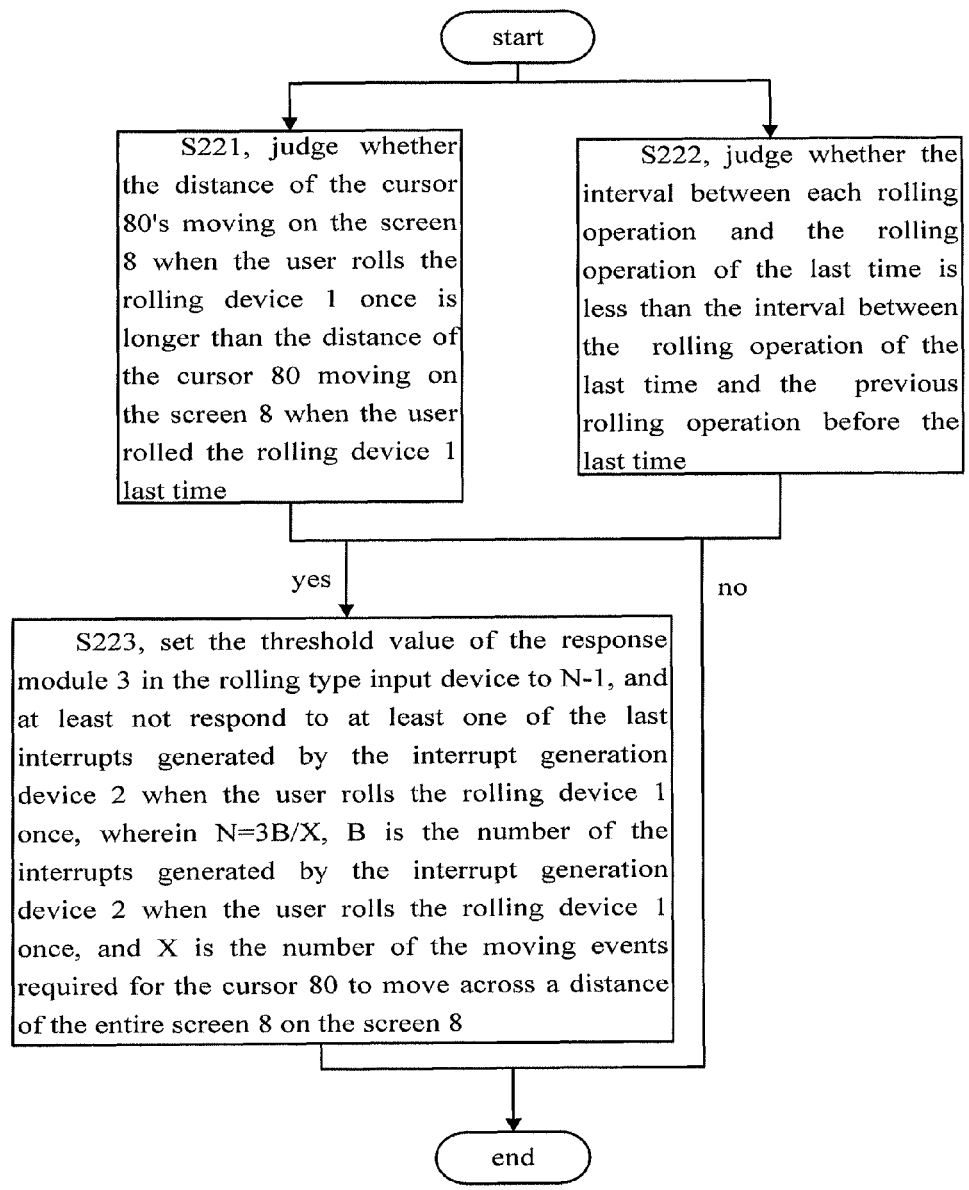
FIG. 11 is a schematic flowchart according to yet another embodiment of step S4 of the method for setting sensitivity of the rolling type input apparatus of the present invention.

As shown in FIGS. 4 and 11, in the event that the user rolls the rolling device 1 to finish at least three operations each of which makes the cursor 80 move across a distance of longer than ⅔ of the screen 8 on the screen 8, the method of setting the threshold value according to the detected parameters comprises:

S221, judge whether the distance of the cursor 80's moving on the screen 8 when the user rolls the rolling device 1 once is longer than the distance of the cursor 80's moving on the screen when the user rolls the rolling device 1 last time;

S222, judge whether the interval between each rolling operation and the rolling operation of the last time is less than the interval between the rolling operation of the last time and the previous rolling operation before the last time;

S223, if both of the judgment results of S221 and S222 are yes, set the threshold value of the response module 3 in the rolling type input apparatus to N−1, and at least not respond to at least one of the last interrupts generated by the interrupt generation device 2 in each rolling process when the user rolls the rolling device 1 once, wherein N=3B/X, B is the number of the interrupts generated by the interrupt generation device 2 when the user rolls the rolling device 1 once, and X is the number of the moving events required for the cursor 80 to move across a distance of the entire screen 8 on the screen 8.

The performance of the above S221 and S222 is not limited by the sequence.

This case is also mainly aimed at the long-distance moving scene. It shows that the operation of the user is skillful and the rolling action is faster and faster, if the distance of the cursor 80's moving on the screen 8 when the user rolls the rolling device 1 once is longer than the distance of the cursor 80's moving on the screen 8 when the user rolls the rolling device 1 last time, and the interval between each rolling operation and the rolling operation of the last time is less than the interval between the rolling operation of the last time and the previous rolling operation before the last time. To avoid the problem of excessive rolling in the process of the user's rolling the rolling device 1, the response speed of the response module 3 needs to be reduced gradually. Of course, in this embodiment, there are many methods to reduce the response speed of the response module 3, such as responding to less interrupts or increasing the threshold value. In this embodiment, the response module 3 preferably does not respond to the last one or two of the interrupts generated by the interrupt generation device 2 in each rolling process.

As shown in FIG. 2 and FIG. 4, the rolling type input apparatus in an embodiment of the present invention comprises a rolling device 1, an interrupt generation device 2, a response module 3, a detection module 4 and a setting module 5, wherein:

the interrupt generation device 2 is configured to detect a rolling direction and rolling distance of the rolling device 1 in the rolling process of the rolling device 1, and generate corresponding interrupts according to the rolling direction and rolling distance of the rolling device 1;

the response module 3 is configured to identify the number and directions of the interrupts, and respond to the interrupts once by transmitting a moving event signal for controlling a cursor 80 to move on a screen 8 when the number of the interrupts in the same direction reaches a threshold value;

the detection module 4 is configured to detect parameters reflecting the speed and amplitude of operations of a user for rolling the rolling device 1;

the setting module 5 is configured to set the threshold value according to the parameters detected by the detection module 4.

When the sensitivity of the rolling type input apparatus is set in the embodiment of the present invention, the parameters reflecting the speed and amplitude of operations of a user for rolling the rolling device 1 may be detected firstly by the detection module 4, thus the habits and the characteristics of operations of the user for using the rolling device 1 in the rolling type input apparatus may be acquired and determined, and then the threshold value may be set according to the detected parameters by the setting module 5.

Since the threshold value is inversely proportional to the number of times that interrupts are responded to by the response module 3 and to the number of the moving event signals transmitted for controlling the cursor 80 to move on the screen 8, and the number of the moving event signals is consistent with the number of the moving events which is directly related with the speed and number of times of the cursor 80's moving on the screen 8, the more the number of times that interrupts are responded to, the higher the sensitivity of the rolling type input apparatus is experienced by the user. Therefore, the sensitivity of the rolling type input apparatus may be set by the way of setting the threshold value.

Compared to the prior art, the embodiments of the present invention have a higher automation degree because there is no need for the user to constantly modify and try the parameters which may reflect the sensitivity in personal in long-term use. Even if the user is totally inexperienced in setting the sensitivity of the rolling input apparatus or uses a new brand or type of electronic equipment, the rolling type input apparatus in the embodiments of the present invention is also able to determine the habits and characteristics of operations of the user according to the speed and amplitude of the user for using the rolling type input apparatus, and then automatically set the sensitivity suitable for the user, thus solving the technical problem that the traditional method for setting sensitivity of the rolling type input apparatus is troublesome.

In this embodiment, the parameters reflecting the speed and the amplitude of operations of the user for rolling the rolling device 1 comprise any one or combination of the following parameters:

the number of the moving events required for the cursor 80's to move across a distance of the entire screen 8 on the screen 8;

the number of the interrupts generated by an interrupt generation device 2 in the rolling type input apparatus when the rolling device 1 is rolled once;

a distance of the cursor 80's moving on the screen 8 when the rolling device 1 is rolled once;

a duration for the rolling device 1 being rolled once;

an interval between two rolling operations.

The number of the moving events required for the cursor 80 to move across a distance of the entire screen 8 on the screen 8 is equivalent to the number of times that the direction-key is pressed required for the cursor 80 controlled by the direction-key of a common keyboard to move across a distance of the entire screen 8 on the screen 8.

Of course, besides the above disclosed parameters, the parameters reflecting the speed and the amplitude of operations of a user for using the rolling type input apparatus in this embodiment may be other parameters.

In this embodiment, the response module 3, the detection module 4 and the setting module 5 are preferably software modules. It has a lower cost and is easy to modify the setting to realize the functions of the response module 3, the detection module 4 and the setting module 5 by the software. Of course, the response module 3, the detection module 4 and/or the setting module 5 may also be a hardware module.

A further improvement of this embodiment is shown in FIG. 3, wherein the rolling type input apparatus further comprises a prompting module 6, for prompting the user to perform the designated operation on the rolling device 1 so as for the detection module 4 to detect the parameters reflecting the speed and the amplitude of operations of the user for rolling the rolling device 1 and for the setting module 5 to set the threshold value according to the detected parameters.

The prompting module 6 may direct the user pertinently to roll the rolling device 1 in the rolling type input apparatus according to requirements by any way of playing a prompt tone, popping up a prompt dialog box, displaying a prompt text, playing an animation etc., which helps to detect the parameters required for setting the sensitivity of the rolling type input apparatus accurately, rapidly and effectively.

The rolling device 1 may be a trackball or a mouse wheel. The trackball and the mouse wheel are both popular rolling devices 1, which are suitable to adopt the technical solution provided in the embodiment of the present invention to set their own sensitivities and to improve their own intelligent degrees. Of course, the technical solution provided in the embodiment of the present invention may also be applied to the other rolling devices besides the trackball or mouse wheel. The rolling type input apparatus 1 may be a wheel mouse, a steering wheel of game machine or other electronic equipment.

In this embodiment, the interrupt generation device 2 may be a Hall component. The Hall component is a solid electronic device by use of Hall effect, and may detect the change of a magnetic field and transform the change of the magnetic field into a electric signal to be output. The Hall component may be used to monitor and measure the change of operation parameters of each part, such as position, displacement, angle, angular velocity, rotational speed, etc., and has the features of stable performance and mature technique, which is suitable for the embodiment of the present invention. Of course, besides a sensor and a Hall component, the interrupt generation device 2 in this embodiment may also be a device which may identify the direction and the distance and may generate corresponding interrupts according to the direction and distance.

As shown in FIG. 4, the electronic equipment in an embodiment of the present invention comprises a cursor control module 7, a rolling type input apparatus, a detection module 4 and a setting module 5. The rolling type input apparatus comprises a rolling device 1, an interrupt generation device 2 and a response module 3, wherein, the interrupt generation device 2 is configured to detect a rolling direction and the rolling distance of the rolling device 1 in the rolling process of the rolling device 1, and generate corresponding interrupts according to the rolling direction and the rolling distance of the rolling device 1;

the response module 3 is configured to identify the number and directions of the interrupts, and respond to the interrupts once by transmitting a moving event signal for controlling a cursor 80 to move on a screen 8 when the number of the interrupts in the same direction reaches a threshold value;

the cursor control module 7 is configured to identify each moving event signal and control the cursor 80 to finish the moving event corresponding to each moving event signal on the screen 8;

the detection module 4 is configured to detect parameters reflecting the speed and amplitude of operations of a user for rolling the rolling device 1;

the setting module 5 is configured to set the threshold value according to the parameters detected by the detection module 4.

In a similar way to the rolling type input apparatus in the above embodiment of the present invention, when setting the sensitivity of the rolling type input apparatus in the embodiment of the present invention, the parameters reflecting the speed and the amplitude of operations of a user for rolling the rolling device 1 may be detected firstly by the detection module 4, thus the habits and the characteristics of operations of the user for using the rolling device 1 in the rolling type input apparatus may be acquired and determined, and then the threshold value of the response module 3 may be set according to the detected parameters by the setting module 5.

Since the threshold value is inversely proportional to the number of times that interrupts are responded to by the response module 3 and to the number of the moving event signals transmitted for controlling the cursor 80 to move on the screen 8, and the number of the moving event signals is consistent with the number of the moving events which is directly related with the speed and number of times of the cursor 80's moving on the screen 8, the more the number of times that interrupts are responded to, the higher the sensitivity of the rolling type input apparatus is experienced by the user. Therefore, the sensitivity of the rolling type input apparatus may be set by the way of setting the threshold value.

Compared to the prior art, the embodiments of the present invention have a higher automation degree because there is no need for the user to constantly modify and try the parameters reflecting the sensitivity in personal in long-term use. Even if the user is totally inexperienced in setting the sensitivity of the rolling input apparatus or uses a new brand or type of electronic equipment, the rolling type input apparatus in the embodiments of the present invention is also able to determine the habits and characteristics of operations of the user according to the speed and amplitude of the user for using the rolling type input apparatus, and then automatically set the sensitivity suitable for the user, thus solving the technical problem that the traditional method for setting sensitivity of the rolling type input apparatus is troublesome.

A further improvement of this embodiment is shown in FIG. 4, wherein the rolling type input apparatus further comprises a prompting module 6, for prompting the user to perform the designated operation on the rolling device 1 so as for the detection module 4 to detect the parameters reflecting the speed and the amplitude of operations of the user for rolling the rolling device 1 and for the setting module 5 to set the threshold value according to the detected parameters.

The prompt module 6 may direct the user pertinently to roll the rolling device 1 in the rolling type input apparatus according to requirements by any way of playing a prompt tone, popping up a prompt dialog box, displaying a prompt text, playing an animation etc., which helps to detect the parameters required for setting the sensitivity of the rolling type input apparatus accurately, rapidly and effectively.

In this embodiment, the cursor control module 7 may be a main chip, or may be other controllers with data processing capacity provided in the electronic equipment.

According to the foregoing embodiments, those skilled in the art are clearly aware that the present invention may be implemented through hardware or through software plus a necessary universal hardware platform. Thus, the technical solution of the present invention may be made into software. The software may be stored in a non-volatile storage medium (for example, a CD-ROM, a USB disk, and a mobile hard disk), and include several notifications that instruct a computer device (such as a personal computer, a server, or a network device) to perform the methods provided in each embodiment of the present invention.

The foregoing is only preferred embodiments of this invention. The protection scope of this invention, however, is not limited to the above description. Any alteration or substitution within the technical scope disclosed by this invention, easily occurring to those skilled in the art should be covered by the protection scope of this invention. Therefore, the protection scope of the present invention should be determined according to claims.

What is claimed is:

1. A method for setting sensitivity of a rolling type input apparatus, comprising:

detecting, by the rolling type input apparatus, parameters reflecting speeds and amplitudes of a plurality of operations that a user rolls a rolling device to determine habits of operations that the user uses the rolling device in the rolling type input apparatus;

setting, by the rolling type input apparatus, a threshold value based on the detected parameters automatically, wherein the threshold value corresponds to the habits of operations that the user uses the rolling device in the rolling type input apparatus, the rolling type input apparatus is configured to detect a rolling direction and rolling distance of the rolling device in the rolling process of the rolling device, generate corresponding interrupts according to the rolling direction and rolling distance of the rolling device, identify the number and directions of the interrupts, and respond to the interrupts for a preset number of times by transmitting a moving event signal for controlling a cursor to move on a screen when the number of the interrupts in the same direction reaches the threshold value, wherein the parameters comprises a number of interrupts generated when the rolling device is rolled for a preset number of times, and the threshold value is set at least partially based on a value which is obtained by dividing the number of interrupts generated when the rolling device is rolled for a preset number of times by number of moving events which have been finished by the cursor on the screen when the rolling device is rolled for a preset number of times.

2. The method according to claim 1, before rolling the rolling device, the method further comprising:

prompting, by the rolling type input apparatus, the user to perform a designated rolling operation on the rolling device, so as to detect the parameters reflecting the speeds and amplitudes of the plurality of operations that the user rolls the rolling device.

3. The method according to claim 1, wherein the parameters reflecting the speeds and amplitudes of the plurality of operations that the user rolls the rolling device comprise any one or combination of the following parameters:

the number of moving events required for the cursor to move across a distance of the entire screen on the screen;

the number of the interrupts generated by an interrupt generation device in the rolling type input apparatus when the rolling device is rolled once;

a distance of the cursor's moving on the screen when the rolling device is rolled once;

a duration for the rolling device being rolled once; and an interval between two rolling operations.

4. The method according to claim 3, wherein the setting a threshold value based on the detected parameters comprises:
  detecting, by the rolling type input apparatus, the number of the interrupts generated by the interrupt generation device when the user rolls the rolling device once, and setting the threshold value of a response module in the rolling type input apparatus to N=3B/X,
  wherein B is the number of the interrupts generated by the interrupt generation device when the user rolls the rolling device once, and X is the number of the moving events required for the cursor to move across a distance of the entire screen on the screen.

5. The according to claim 3, wherein in the event that the user rolls the rolling device to finish at least two operations each of which makes the cursor move across a distance of less than ⅓ of the screen on the screen, the setting a threshold value based on the detected parameters comprises:
  S201, determining, by the rolling type input apparatus, whether the ratio of the distance of the cursor's moving on the screen when the user rolls the rolling device once to the average value of the distance of the cursor's moving on the screen when the user rolls the rolling device once previously is between 0.8 and 1.2;
  S202, determining, by the rolling type input apparatus, whether the ratio of the duration of the user's rolling the rolling device once to the average value of the duration of the user's rolling the rolling device once previously is between 0.8 and 1.2;
  S203, determining, by the rolling type input apparatus, whether the interval between the two rolling operations is not longer than 0.5 second;
  S204, if all determination results of S201, S202 and S203 are yes, setting, by the rolling type input apparatus, the interrupts responded to by a response module as responding to the first interrupt generated by the interrupt generation device when the user rolls the rolling device once; and setting the threshold value to N+1, wherein N=3B/X, B is the number of the interrupts generated by the interrupt generation device when the user rolls the rolling device once, and X is the number of the moving events required for the cursor to move across a distance of the entire screen on the screen;
  S205, if all determination results of S201, S202 and S203 are no, setting the threshold value of the rolling type input apparatus to no larger than 2.

6. The method according to claim 3, wherein in the event that the user rolls the rolling device to finish at least two operations each of which makes the cursor move across a distance of longer than ⅔ of the screen on the screen, the setting a threshold value based on the detected parameters comprises:
  S211, determining, by the rolling type input apparatus, whether the ratio of the distance of the cursor's moving on the screen when the user rolls the rolling device once to the average value of the distance of the cursor's moving on the screen when the user rolls the rolling device once previously is between 0.8 and 1.2;
  S212, determining, by the rolling type input apparatus, whether the interval between the two rolling operations is longer than 0.5 second;
  S213, if both of the determination results of S211 and S212 are yes, subtracting, by the rolling type input apparatus, 1 from the threshold value of the rolling type input apparatus after finishing each moving event until a preset minimum value is reached.

7. The method according to claim 3, wherein in the event that the user rolls the rolling device to finish at least three operations each of which makes the cursor move across a distance of longer than ⅔ of the screen on the screen, the setting a threshold value based on the detected parameters comprises:
  S221, determining, by the rolling type input apparatus, whether the distance of the cursor's moving on the screen when the user rolls the rolling device once is longer than the distance of the cursor's moving on the screen when the user rolled the rolling device last time;
  S222, determining, by the rolling type input apparatus, whether the interval between each rolling operation and the rolling operation of the last time is less than the interval between the rolling operation of the last time and the previous rolling operation before the last time;
  S223, if both of the determination results of S221 and S222 are yes, setting, by the rolling type input apparatus, the threshold value of a response module in the rolling type input apparatus to N−1, and at least not responding to at least one of the last interrupts generated by the interrupt generation device when the user rolls the rolling device once, wherein N=3B/X, B is the number of the interrupts generated by the interrupt generation device when the user rolls the rolling device once, and X is the number of the moving events required for the cursor to move across a distance of the entire screen on the screen.

8. A rolling type input apparatus, comprising: a rolling device, an interrupt generation device, a response module, a detection module and a setting module, wherein
  the detection module is configured to detect parameters reflecting speeds and amplitudes of a plurality of operations that a user rolls the rolling device to determine habits of operations that the user uses the rolling device in the rolling type input apparatus;
  the setting module is configured to set a threshold value based on the parameters detected by the detection module automatically, wherein the threshold value corresponds to the habits of operations that the user uses the rolling device in the rolling type input apparatus;
  the interrupt generation device is configured to detect a rolling direction and rolling distance of the rolling device in the rolling process of the rolling device, and generate corresponding interrupts according to the rolling direction and rolling distance of the rolling device;
  the response module is configured to identify the number and directions of the interrupts, and respond to the interrupts once by transmitting a moving event signal for controlling a cursor to move on a screen when the number of the interrupts in the same direction reaches the threshold value,
  wherein the parameters comprise a number of interrupts generated when the rolling device is rolled for a preset number of times, and the threshold value is set at least partially based on a value which is obtained by dividing the number of interrupts generated when the rolling device is rolled for a preset number of times by number of moving events which have been finished by the cursor on the screen when the rolling device is rolled for a preset number of times.

9. The apparatus according to claim 8, further comprising a prompting module;
  the prompting module is configured to prompt the user to perform the designated operation on the rolling device, so as for the detection module to detect the parameters reflecting the speeds and amplitudes of a plurality of operations that the user rolls the rolling device and for the setting module to set the threshold value based on the detected parameters.

10. The apparatus according to claim 8, wherein the rolling device is a trackball or mouse wheel.

11. An electric equipment, comprising a cursor control module, a rolling type input apparatus, a detection module and a setting module, the rolling type input apparatus comprising a rolling device, an interrupt generation device and a response module, wherein the detection module is configured to detect parameters reflecting speeds and amplitudes of the plurality of a plurality of operations that a user rolls the rolling device to determine habits of operations that the user uses the rolling device in the rolling type input apparatus;

the setting module is configured to set a threshold value based on the parameters detected by the detection module automatically, wherein the threshold value corresponds to the habits of operations that the user uses the rolling device in the rolling type input apparatus;

the interrupt generation device is configured to detect a rolling direction and rolling distance of the rolling device in the rolling process of the rolling device, and generate corresponding interrupts according to the rolling direction and rolling distance of the rolling device;

the response module is configured to identify the number and directions of the interrupts, and respond to the interrupts once by transmitting a moving event signal for controlling a cursor to move on a screen when the number of the interrupts in the same direction reaches the threshold value;

the cursor control module is configured to identify each moving event signal and control the cursor to finish the moving event corresponding to each moving event signal on the screen, wherein the parameters comprise a number of interrupts generated when the rolling device is rolled for a preset number of times, and the threshold value is set at least partially based on a value which is obtained by dividing the number of interrupts generated when the rolling device is rolled for a preset number of times by number of moving events which have been finished by the cursor on the screen when the rolling device is rolled for a preset number of times.

12. The apparatus according to claim 8, wherein the parameters reflecting the speeds and amplitudes of the plurality of operations that the user rolls the rolling device comprise any one or combination of the following parameters:

the number of moving events required for the cursor to move across a distance of the entire screen on the screen;

the number of the interrupts generated by an interrupt generation device in the rolling type input apparatus when the rolling device is rolled once;

a distance of the cursor's moving on the screen when the rolling device is rolled once;

a duration for the rolling device being rolled once; and an interval between two rolling operations.

13. The apparatus according to claim 12, the setting module is configured to detect the number of the interrupts generated by the interrupt generation device when the user rolls the rolling device once, and set the threshold value of a response module in the rolling type input apparatus based on two parameters B and X, wherein B is the number of the interrupts generated by the interrupt generation device when the user rolls the rolling device once, and X is the number of the moving events required for the cursor to move across a distance of the entire screen on the screen.

14. The apparatus according to claim 12, wherein in the event that the user rolls the rolling device to finish at least two operations each of which makes the cursor move across a distance of less than ⅓ of the screen on the screen, the setting module is configured to:

S201, determine whether the ratio of the distance of the cursor's moving on the screen when the user rolls the rolling device once to the average value of the distance of the cursor's moving on the screen when the user rolls the rolling device once previously is between 0.8 and 1.2;

S202, determine whether the ratio of the duration of the user's rolling the rolling device once to the average value of the duration of the user's rolling the rolling device once previously is between 0.8 and 1.2;

S203, determine whether the interval between the two rolling operations is not longer than 0.5 second;

S204, if all determination results of S201, S202 and S203 are yes, set the interrupts responded to by a response module as responding to the first interrupt generated by the interrupt generation device when the user rolls the rolling device once; and set the threshold value to N+1, wherein N=3B/X, B is the number of the interrupts generated by the interrupt generation device when the user rolls the rolling device once, and X is the number of the moving events required for the cursor to move across a distance of the entire screen on the screen;

S205, if all determination results of S201, S202 and S203 are no, set the threshold value of the rolling type input apparatus to no larger than 2.

15. The apparatus according to claim 12, wherein in the event that the user rolls the rolling device to finish at least two operations each of which makes the cursor move across a distance of longer than ⅔ of the screen on the screen, the setting module is configured to:

S211, determine whether the ratio of the distance of the cursor's moving on the screen when the user rolls the rolling device once to the average value of the distance of the cursor's moving on the screen when the user rolls the rolling device once previously is between 0.8 and 1.2;

S212, determine whether the interval between the two rolling operations is longer than 0.5 second;

S213, if both of the determination results of S211 and S212 are yes, subtract 1 from the threshold value of the rolling type input apparatus after finishing each moving event until a preset minimum value is reached.

16. The apparatus according to claim 12, wherein in the event that the user rolls the rolling device to finish at least three operations each of which makes the cursor move across a distance of longer than ⅔ of the screen on the screen, the setting module is configured to:

S221, determine whether the distance of the cursor's moving on the screen when the user rolls the rolling device once is longer than the distance of the cursor's moving on the screen when the user rolled the rolling device last time;

S222, determine whether the interval between each rolling operation and the rolling operation of the last time is less than the interval between the rolling operation of the last time and the previous rolling operation before the last time;

S223, if both of the determination results of S221 and S222 are yes, set the threshold value of a response module in the rolling type input apparatus to N−1, and at least not responding to at least one of the last interrupts generated by the interrupt generation device when the user rolls the rolling device once, wherein N=3B/X, B is the number of the interrupts generated by the interrupt generation device when the user rolls the rolling device once, and X is the number of the moving events required for the cursor to move across a distance of the entire screen on the screen.

17. The electric equipment according to claim 11, further comprising a prompting module;
    the prompting module is configured to prompt the user to perform the designated operation on the rolling device, so as for the detection module to detect the parameters reflecting the speeds and amplitudes of the plurality of operations that the user rolls the rolling device and for the setting module to set the threshold value based on the detected parameters.

18. The electric equipment according to claim 11, wherein the parameters reflecting the speeds and amplitudes of the plurality of operations that the user rolls the rolling device comprise any one or combination of the following parameters:
    the number of moving events required for the cursor to move across a distance of the entire screen on the screen;
    the number of the interrupts generated by an interrupt generation device in the rolling type input apparatus when the rolling device is rolled once;
    a distance of the cursor's moving on the screen when the rolling device is rolled once;
    a duration for the rolling device being rolled once; and
    an interval between two rolling operations.

19. The electric equipment according to claim 18, the setting module is configured to detect the number of the interrupts generated by the interrupt generation device when the user rolls the rolling device once, and set the threshold value of a response module in the rolling type input apparatus based on two parameters B and X, wherein B is the number of the interrupts generated by the interrupt generation device when the user rolls the rolling device once, and X is the number of the moving events required for the cursor to move across a distance of the entire screen on the screen.

20. The electric equipment according to claim 18, wherein in the event that the user rolls the rolling device to finish at least two operations each of which makes the cursor move across a distance of less than ⅓ of the screen on the screen, the setting module is configured to:
    S201, determine whether the ratio of the distance of the cursor's moving on the screen when the user rolls the rolling device once to the average value of the distance of the cursor's moving on the screen when the user rolls the rolling device once previously is between 0.8 and 1.2;
    S202, determine whether the ratio of the duration of the user's rolling the rolling device once to the average value of the duration of the user's rolling the rolling device once previously is between 0.8 and 1.2;
    S203, determine whether the interval between the two rolling operations is not longer than 0.5 second;
    S204, if all determination results of S201, S202 and S203 are yes, set the interrupts responded to by a response module as responding to the first interrupt generated by the interrupt generation device when the user rolls the rolling device once; and set the threshold value to N+1, wherein N=3B/X, B is the number of the interrupts generated by the interrupt generation device when the user rolls the rolling device once, and X is the number of the moving events required for the cursor to move across a distance of the entire screen on the screen;
    S205, if all determination results of S201, S202 and S203 are no, set the threshold value of the rolling type input apparatus to no larger than 2.

21. The electric equipment according to claim 18, wherein in the event that the user rolls the rolling device to finish at least two operations each of which makes the cursor move across a distance of longer than ⅔ of the screen on the screen, the setting module is configured to:
    S211, determine whether the ratio of the distance of the cursor's moving on the screen when the user rolls the rolling device once to the average value of the distance of the cursor's moving on the screen when the user rolls the rolling device once previously is between 0.8 and 1.2;
    S212, determine whether the interval between the two rolling operations is longer than 0.5 second;
    S213, if both of the determination results of S211 and S212 are yes, subtract 1 from the threshold value of the rolling type input apparatus after finishing each moving event until a preset minimum value is reached.

22. The electric equipment according to claim 18, wherein in the event that the user rolls the rolling device to finish at least three operations each of which makes the cursor move across a distance of longer than ⅔ of the screen on the screen, the setting module is configured to:
    S221, determine whether the distance of the cursor's moving on the screen when the user rolls the rolling device once is longer than the distance of the cursor's moving on the screen when the user rolled the rolling device last time;
    S222, determine whether the interval between each rolling operation and the rolling operation of the last time is less than the interval between the rolling operation of the last time and the previous rolling operation before the last time;
    S223, if both of the determination results of S221 and S222 are yes, set the threshold value of a response module in the rolling type input apparatus to N−1, and at least not responding to at least one of the last interrupts generated by the interrupt generation device when the user rolls the rolling device once, wherein N=3B/X, B is the number of the interrupts generated by the interrupt generation device when the user rolls the rolling device once, and X is the number of the moving events required for the cursor to move across a distance of the entire screen on the screen.

* * * * *